(No Model.)
O. B. SHALLENBERGER.
SYSTEM OF ELECTRICAL DISTRIBUTION.
No. 571,849. Patented Nov. 24, 1896.
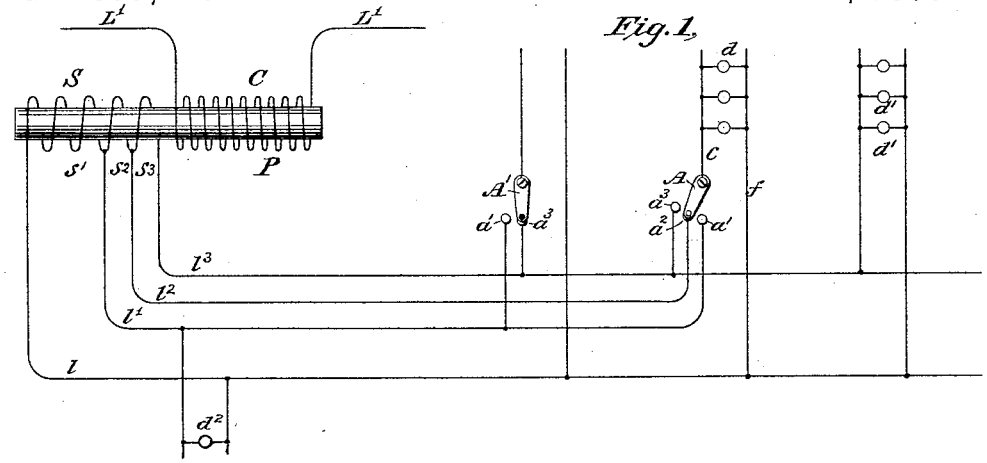
Fig. 1.
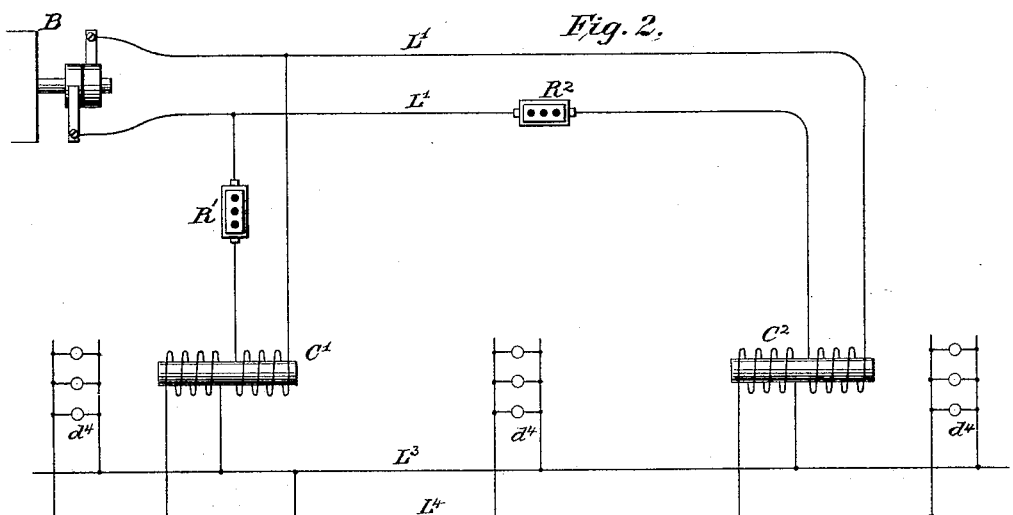
Fig. 2.
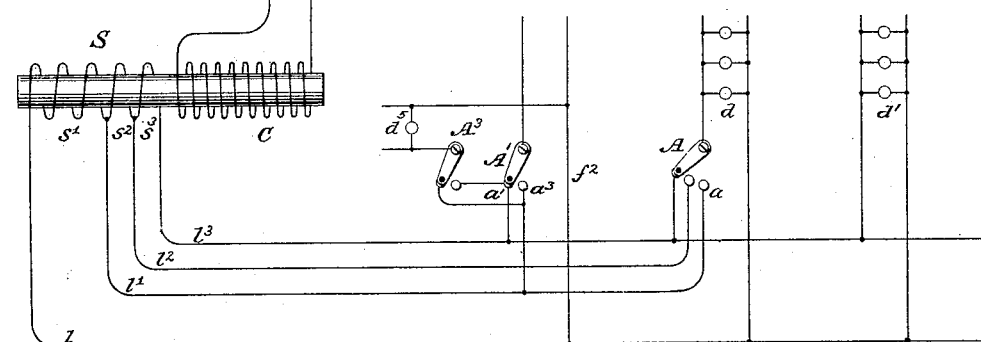
Witnesses
Geo. W. Breck
Carrie E. Ashley
Inventor
O. B. Shallenberger
By his Attorneys
Pope & Edgecomb
THE NORRIS PETERS CO., PHOTO-LITHO., WASHINGTON, D. C.

United States Patent Office.

OLIVER B. SHALLENBERGER, OF ROCHESTER, PENNSYLVANIA, ASSIGNOR, BY MESNE ASSIGNMENTS, TO THE WESTINGHOUSE ELECTRIC AND MANUFACTURING COMPANY, OF PITTSBURG, PENNSYLVANIA.

SYSTEM OF ELECTRICAL DISTRIBUTION.

SPECIFICATION forming part of Letters Patent No. 571,849, dated November 24, 1896.

Application filed November 8, 1886. Serial No. 218,255. (No model.)

*To all whom it may concern:*

Be it known that I, OLIVER B. SHALLENBERGER, a citizen of the United States, residing in Rochester, Beaver county, in the State of Pennsylvania, have invented certain new and useful Improvements in Systems of Electrical Distribution, of which the following is a specification.

The invention relates especially to the class of circuits and apparatus employed for utilizing alternating or periodically-varying electric currents for operating translating devices, such, for instance, as incandescent electric lights.

The object of the invention is primarily to secure convenient and effective means for regulating the amount of current delivered to the translating devices and for rendering it possible to easily modify the amount of current delivered to different translating devices or groups of the same independently of each other.

It has become customary to supply alternating currents from a generator of suitable character and conduct them through one or more main-line conductors to points near where they are to be utilized. At these points the current is converted into a current of similar character, but having a potential better adapted to the work to be performed. This last current is then delivered to the translating devices which are to be operated thereby. Such change in the potential is secured by means of converters or induction-coils having their primary and secondary coils suitably proportioned to each other for that purpose. Thus if the primary current is of higher potential than is required for operating the translating devices the secondary coil of the converter is constructed with fewer convolutions than the primary coil. The current obtained thus from the secondary coil is dependent upon its length and conductivity relative to the length and conductivity of the primary coil. Now it is evident that by leading the conductors from different points in the length of the secondary coil currents of different potential may be obtained.

This invention consists, in general terms, in employing in an electric-lighting system of the character described a converter having its secondary coil formed in sections, from which independent conductors lead to corresponding switch-points. The translating devices or groups of the same may be connected in circuit between one terminal of the secondary coil and any one of these switch-points at will, and thus the potential of the current yielded to the translating devices may be diminished or increased as required. By the use of this means of regulation the reduction of current in the lamps is accomplished by a saving of power, whereas in the usual method, in which resistance is introduced in series with the lamp, a certain amount of energy must be wasted in the resistance.

The invention involves further details which will be described in connection with the drawings, in which—

Figure 1 is a diagram illustrating the application of the invention to a system of electric lighting, and Fig. 2 illustrates an extension of the system.

Referring to the figures, L' L' represent a main line of an electric-lighting system which is designed to be supplied with an alternating electric current in any well-known manner. The primary coil P of a converter C is included in this line. The secondary coil S of this converter is constructed in sections $s'$ $s^2$ $s^3$. A conductor $l$ leads from one terminal of the secondary coil, and a series of conductors $l'$ $l^2$ $l^3$ lead from the respective sections.

It is evident that the potential of the induced currents in the secondary coil will depend upon the length of the active wire, so that the difference of potential between the conductors $l$ and $l^2$ will be less than that between the conductors $l$ and $l^3$ and greater than between $l$ and $l'$. As it frequently happens that it is desired to operate some translating devices or incandescent lights with currents of lower potential than others, or, in other words, to turn down some of the lights without affecting the others, the conductors $l'$ $l^2$ $l^3$ are led parallel with each other and are provided with suitable means whereby certain of the translating devices connected with the conductor $l$ may be placed in multiple arc between this last-named conductor and either of the other three. A convenient construction consists in leading the conductors $l'$ $l^2$ $l^3$ to contact-points $a'$ $a^2$ $a^3$, respectively, and in providing these points with a switch A, connected with a conductor $c$. The lights $d$ to be regulated are included between the conductor $c$ and a conductor $f$, leading from the conductor $l$. By means of the switch A, therefore, the potential between the conductors $f$ and $c$ may be readily modified.

In some instances it may not be necessary to employ more than two sections of the secondary, as illustrated at the switch A', which is provided with points $a'$ and $a^3$, connected, respectively, with conductors $l'$ and $l^3$, omitting the conductor $l^2$. In other instances it may be desired to maintain the lights at all times in circuit between the conductors of highest potential $l$ and $l^3$, as indicated at $d'$ $d'$. In still other instances the lowest potential will be sufficient at all times, and this is obtained as indicated at $d^2$.

In Fig. 2 the same invention is illustrated as applied to an extended system in which more than one conversion of the current is made. In this instance the main line L', which is supplied from an alternate-current generator B, includes the primaries of two converters C' and C², and the secondaries of these converters are included in multiple arc between two secondary mains L³ and L⁴, which they supply. Adjustable resistances R' R² may be employed for regulating the current supplied to these converters. Translating devices $d^4$ $d^4$ may be operated directly from the secondary mains L³ and L⁴ in the usual manner. A converter C has its primary coils included in multiple arc between the secondary mains L³ L⁴. The connections from the secondary coil S of this converter are of the same character as described with reference to Fig. 1, like letters referring to the similar parts. The object of this arrangement is to overcome the necessity of introducing the primary current, which is usually of comparatively high electromotive force, into places accessible to the user of the light, and at the same time permit control of the current for each lamp as desired. The converter employed for this arrangement is used simply as a regulator and need not produce any change in the electromotive force other than that obtained by using the regulating-switch—that is, the ratio of conversion is unity under normal conditions. It may, however, be used to effect a general reduction of electromotive force and at the same time act as a regulator, if so proportioned. There is shown in this instance still another translating device $d^5$, provided with an independent switch A³. This serves to illustrate the method of operating different lights deriving their currents from a single conductor $f^2$ independently of each other and at different potentials.

I claim as my invention—

1. The combination, substantially as hereinbefore set forth, of a main line, a converter having its primary coil included in the main line, conductors leading from different points in the length of the secondary coil, translating devices or groups of the same, and a circuit-controller for including said translating devices or groups of the same between different conductors leading from the secondary coil, at will.

2. The combination with the primary coil of a converter, of a secondary coil, conductors leading from the different points in the length of the latter, switch-points to which said conductors lead, switches applied to said points and translating devices connected in multiple arc between one of said conductors and one of said switches.

3. The combination, in a system of electrical distribution, of a source of alternating currents, a converter having its primary coil supplied from said source, a second converter supplied from the secondary circuit of the first-named converter, conductors leading from different points in the length of the secondary coil of the second converter, translating devices and means for including any or all of said devices between the different conductors, substantially as described.

4. The combination, in a system of electrical distribution, of a source of alternating currents, a converter supplied from said source, distributing-conductors supplied from the secondary of said converter, translating devices supplied from said distributing-conductors, a second converter having its primary coil also supplied from said distributing-conductors, other translating devices or groups of the same, and means, substantially such as described, for including the last-named translating devices in circuit with more or less of the secondary coil of the second converter.

5. The combination with a source of electricity, of a converter having its primary coil in circuit therewith, contact-points connected with different points in the length of the secondary coil, a conductor permanently connected with one of said points, a second conductor, a circuit-controller for placing said second conductor in connection with any of said points, a third conductor leading from the terminal of the secondary coil, and translating devices, certain of which are connected in circuit between the last and first named conductors, and other translating devices included between said last-named and the remaining conductor.

6. The combination as hereinbefore set forth, with the main circuit of a system of electrical distribution, of an electric converter connected in the circuit of the source of electricity, two or more secondary circuits extending from the converter, and translating devices or groups of the same connected in said secondary circuits at different points.

7. The combination with the source of electricity, in a system of electrical distribution, and its circuit, of a potential-reducing converter connected in said circuit, two or more secondary circuits derived from the converter, consuming-circuits connected with said secondary circuits at different points, and translating devices connected in said consuming-circuits.

8. The combination with the source of electricity, in a system of electrical distribution, and its circuit, of a potential-reducing converter connected in said circuit, two or more secondary circuits derived from the converter, consuming-circuits connected with said secondary circuits at different points, translating devices connected in said consuming-circuits, and means for regulating the current supplied to said converter.

In testimony whereof I have hereunto subscribed my name this 18th day of October, A. D. 1886.

OLIVER B. SHALLENBERGER.

Witnesses:
  R. H. WHITTLESEY,
  C. M. CLARKE.